(12) United States Patent
Lee et al.

(10) Patent No.: US 9,874,716 B2
(45) Date of Patent: Jan. 23, 2018

(54) LENS DRIVING DEVICE

(71) Applicant: SAMSUNG ELECTRO-MECHANICS CO., LTD., Suwon-si (KR)

(72) Inventors: Tae Kyung Lee, Suwon-si (KR); Hwa Sun Lee, Suwon-si (KR); Jong Beom Kim, Suwon-si (KR); Kyo Yeol Lee, Suwon-si (KR); Sung Sun Kim, Suwon-si (KR)

(73) Assignee: Samsung Electro-Machanics Co., Ltd., Suwon-si (KR)

( * ) Notice: Subject to any disclaimer, the term of this patent is extended or adjusted under 35 U.S.C. 154(b) by 0 days.

(21) Appl. No.: 15/046,548

(22) Filed: Feb. 18, 2016

(65) Prior Publication Data
US 2017/0023763 A1    Jan. 26, 2017

(30) Foreign Application Priority Data

Jul. 22, 2015  (KR) ......................... 10-2015-0103538

(51) Int. Cl.
  *G02B 7/02*    (2006.01)
  *G02B 7/08*    (2006.01)
  *G02B 7/04*    (2006.01)

(52) U.S. Cl.
  CPC ................ *G02B 7/08* (2013.01); *G02B 7/04* (2013.01)

(58) Field of Classification Search
  CPC ..... G02B 26/0875; G02B 7/04; G11B 7/0925; G11B 7/0937; H02K 41/0354; B81B 2201/04
  USPC ......... 359/198.1, 199.1, 199.2, 199.3, 199.4, 359/210.1, 290, 811, 813, 819, 822, 823, 359/824
  See application file for complete search history.

(56) References Cited

U.S. PATENT DOCUMENTS

| 7,170,665 B2 * | 1/2007 | Kaneko .................... G02B 7/02 310/22 |
| 7,952,639 B2 | 5/2011 | Sladen |
| 2007/0035202 A1 | 2/2007 | Imai |
| 2016/0070114 A1 * | 3/2016 | Hubert ................. G02B 27/646 348/208.5 |

FOREIGN PATENT DOCUMENTS

| JP | 2007-37356 A | 2/2007 |
| KR | 10-2005-0042922 A | 5/2005 |
| KR | 10-2008-0001992 A | 1/2008 |

\* cited by examiner

*Primary Examiner* — William Choi
(74) *Attorney, Agent, or Firm* — NSIP Law

(57) ABSTRACT

A lens driving device includes a fixed member, a movable member configured to move with respect to the fixed member, a lens disposed in or on the moveable member, a connection member connecting the fixed member to the movable member, and a protective member disposed on a connection portion. The connection portion is between the fixed member and the connection member or between the movable member and the connection member.

21 Claims, 8 Drawing Sheets

V - V

LENS DRIVING DEVICE

CROSS-REFERENCE TO RELATED APPLICATION

This application claims the benefit under 35 USC 119(a) of Korean Patent Application No. 10-2015-0103538, filed on Jul. 22, 2015 with the Korean Intellectual Property Office, the entire disclosure of which is incorporated herein by reference for all purposes.

BACKGROUND

1. Field

The present disclosure relates to a lens driving device moving a lens.

2. Description of Related Art

A camera device having high resolution includes a plurality of lenses and an image sensor. The camera device as described above may include a moving unit, moving a lens barrel in an optical direction in order to form a vivid image. However, in this structure, because a focal length is adjusted by moving the lens barrel having a considerable mass, a power consumption amount is high, and a structure of the moving unit is complicated, which is disadvantageous for miniaturization of the camera device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens driving device includes a fixed member, a movable member configured to move with respect to the fixed member, a lens disposed in or on the moveable member, a connection member connecting the fixed member to the movable member, and a protective member disposed on a connection portion. The connection portion is between the fixed member and the connection member or between the movable member and the connection member.

The lens driving device may further include an actuator disposed on the connection member, or a first actuator disposed on a first surface of the connection member and a second actuator disposed on a second surface of the connection member. The first and second actuators may have different driving forces from each other. The first surface of the connection member may be opposite the second surface of the connection member. The connection member may extend tangentially from the moveable member.

The lens driving device may further include a sensor, disposed on the fixed member or the movable member, configured to sense movement of the movable member with respect to the fixed member.

The protective member may include a silicone material. The protective member may include a material with a Young's modulus lower than that of the connection member. The protective member may a material with an elastic modulus of 1 GPa or less. The protective member may extend from the connection portion to the actuator.

The fixed member, the movable member, and the connection member may be integrally formed with each other on a silicon wafer.

In another general aspect, the lens driving device includes a fixed member, a movable member in which a lens is disposed, a connection member including a first region and a second region, an actuator, disposed on the connection member in the first region, configured to elastically deform the second region; and a protective member formed on the connection member.

The protective member may be disposed on the connection member in the second region.

The second region may include a meandering shape, and may have a width narrower than that of the first region. The second region may be formed on a connection portion. The connection portion may be disposed between the fixed member and the connection member or a connection portion between the movable member and the connection member, or both.

The lens driving device may further include wing portions radially extending from the moveable member to the fixed member. Restriction portions configured to restrict movement of the movable member in a direction perpendicular to an optical axis may be formed on the fixed member and the wing portions.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
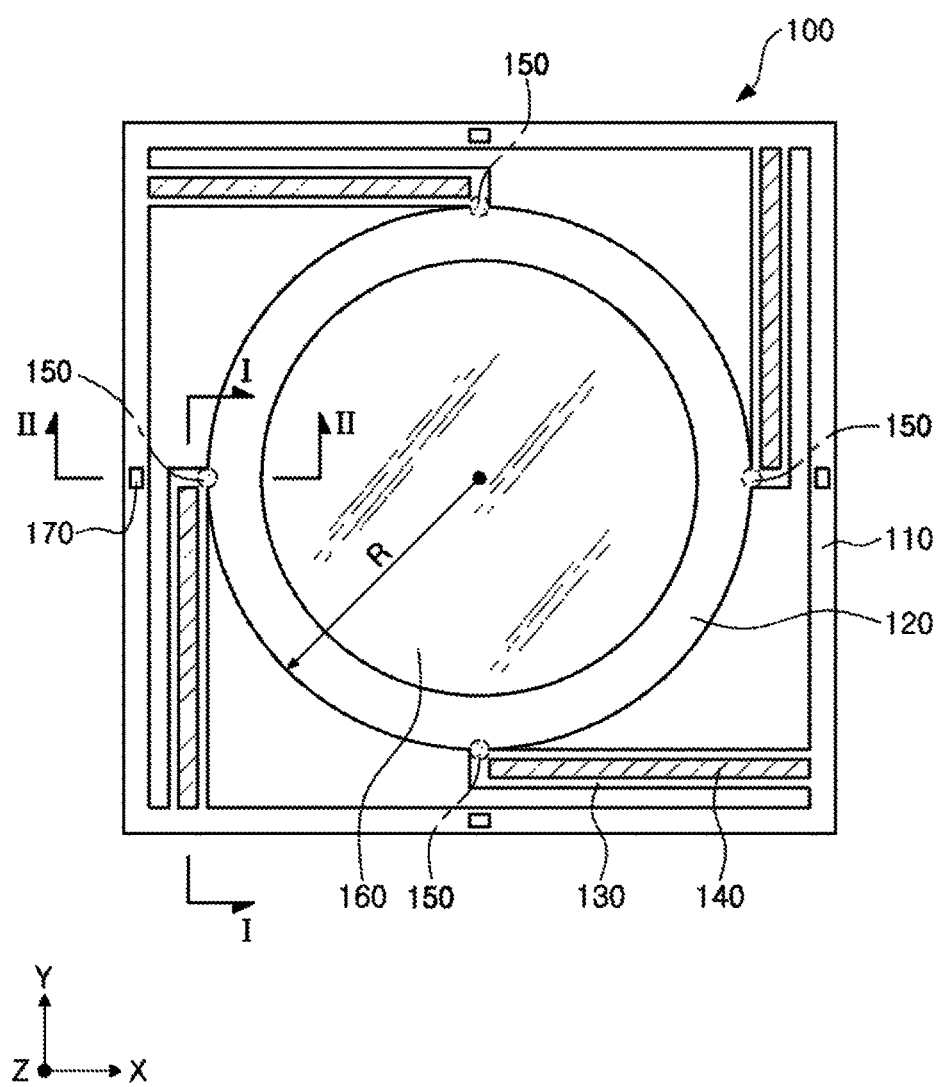
FIG. 1 is a plan view of a lens driving device according to an embodiment.

Referring to FIG. 1, a lens driving device 100 according to an embodiment includes a fixed member 110, a movable member 120, a connection member 130, and a protective member 150.

The fixed member 110 supports the movable member 120. For example, the movable member 120 is accommodated in the fixed member 110. The fixed member 110 is configured so as not to substantially move in relation to a structure on which it is disposed. As an example, the fixed member 110 may be firmly fixed to a body of a camera module, a portable terminal, or mobile device, in which the lens driving device 100 is mounted. Therefore, the fixed member 110 maintains an initial position even if the movable member 120 moves in an optical axis direction. The optical axis direction is aligned to be parallel with the Z axis. As another example, the fixed member 110 may be fixed to a lens module. In other words, the fixed member 110 may be fixed to a lens disposed on an object-side or an image-side of a lens 160.

The fixed member 110 has a substantially tetragonal, or square, shape. For example, in the fixed member 110, four members may be connected to each other while forming right angles to each other. However, a shape of the fixed member 110 is not limited to a tetragon. For example, the shape of the fixed member 110 may be a circle, or polygon. The fixed member 110 may be formed of a silicon wafer. As an example, the fixed member 110 may be manufactured by chemically or mechanically processing the silicon wafer.

The movable member 120 is movable relative with respect to the fixed member 110. For example, the movable member 120 is disposed so as not to be hindered by the fixed member 110. For instance, the movable member 120 may be disposed in an internal space of the fixed member 110. The movable member 120 has the same, or similar, height as the fixed member 110 and the movable member 120 may be disposed on the same plane as the fixed member 110.

The center of the movable member 120 is open so that light refracted by the lens 160 may pass therethrough. The movable member 120 may have a substantially circular shape. However, the shape of the movable member 120 is not limited to a circular shape. For example, the shape of the movable member 120 may vary as long as the movable member 120 supports the lens 160.

The movable member 120 may be formed of a silicon wafer. As an example, the movable member 120 may be manufactured by chemically or mechanically processing the silicon wafer. As another example, the movable member 120 may be formed integrally with the fixed member 110 by chemically or mechanically processing the silicon wafer.

The connection member 130 connects the fixed member 110 and the movable member 120 to each other. As an example, the connection member 130 extends from the fixed member 110 toward the movable member 120. The connection member 130 is formed to have a length longer than a radius R of the movable member 120. As an example, the connection member 130 extends tangentially from the movable member 120 to one portion of the fixed member 110. Elastic deformation of the connection member 130 because the connection member 130 has a considerable length, a sufficient distance in which the movable member 120 may move may be secured.

The lens driving device 100 has multiple connection members 130. As an example, four connection members 130 extend from each side of the fixed member 110 toward the movable member 120. As another example, three connection members 130 may extend from one side and two edges of the fixed member 110 toward the movable member 120.

The connection member 130 may be formed from a silicon wafer. As an example, the connection member 130 may be manufactured by chemically or mechanically processing the silicon wafer. As another example, the connection member 130 may be integrally formed with the fixed member 110 and the movable member 120 by chemically or mechanically processing the silicon wafer.

The protective member 150 is disposed on a connection portion of the connection member 130. As an example, the protective member 150 may be disposed on a connection portion between the fixed member 110 and the connection member 130. As another example, the protective member 150 may be disposed on a connection portion between the movable member 120 and the connection member 130. As another example, the protective member 150 may be disposed on a portion of the connection member 130 which undergoes a large displacement due to movement of the moveable member 120.

The protective member 150 is formed of a material having a Young's modulus lower than that of the connection member 130. Furthermore, the protective member 150 is formed of a material having a substantially low elastic modulus. As an example, the protective member 150 may be formed of a material having an elastic modulus of 1 GPa or less. As another example, the protective member 150 may be formed of a material having an elastic modulus of 1 to 150 Mpa. As an example, the protective member 150 may be formed of a silicone material such as a room temperature vulcanizing (RTV) silicone material. However, the material of the protective member 150 is not limited to silicone. For example, the protective member 150 may be formed of another material as long as the material has the above-mentioned elastic modulus.

The protective member 150, as described above, may be formed on the connection portion between the fixed member 110 and the connection member 130 or the connection portion between the movable member 120 and the connection member 130, to prevent damage that may occur at the connection portions due to elastic deformation.

The lens driving device 100 further includes an actuator 140, the lens 160, and a sensor 170. The actuator 140 is disposed on the connection member 130. As an example, the actuator 140 may be disposed on one or both surfaces of the connection member 130. The actuator 140 is formed to have substantially the same length, or a substantially similar length, as that of the connection member 130. The actuator 140 extends from the connection portion, between the fixed member 110 and the connection member 130, in a length direction of the connection member 130.

The actuator 140 converts electrical energy into mechanical energy. As an example, the actuator 140 may include a piezoelectric element. As another example, the actuator 140 may be formed by bonding heterogeneous materials. The actuator 140 as described above generates a driving force according to external electrical signals to elastically deform the connection member 130, which may cause warpage of the connection member 130.

The actuator 140 elastically deforms the connection member 130 to generate a driving force so that auto-focusing or tilt compensation of the lens 160 may be performed. As an example, the actuator 140 may generate a driving force so that four connection members 130 are deformed so as to bend toward the object-side (in a +Z-axis direction in FIG. 1). As another example, the actuator 140 may generate a driving force so that four connection members 130 are bent toward the image-side (in a −Z-axis direction in FIG. 1). As another example, the actuator 140 may generate a driving force so that some of the connection members 130 may be bent toward the object-side or the image-side.

The lens 160 is disposed on or in the movable member 120. As an example, one or more lenses 160 may be disposed on one side or both sides of the movable member 120. The lens 160 may have a predetermined refractive power. As an example, the lens 160 may have a shape and refractive power capable of adjusting a focal length of an optical system.

The sensor 170 senses a change in position of the movable member 120. As an example, the sensor 170 may be disposed on the fixed member 110 to sense a change in position of the movable member 120 with respect to the fixed member 110. The sensor 170 may sense a tilt of the movable member 120. As an example, a plurality of sensors 170 each sense a position of the movable member 120 adjacent thereto and calculate a deviation between these positions, thereby sensing the tilt of the movable member 120.

Figure 2:
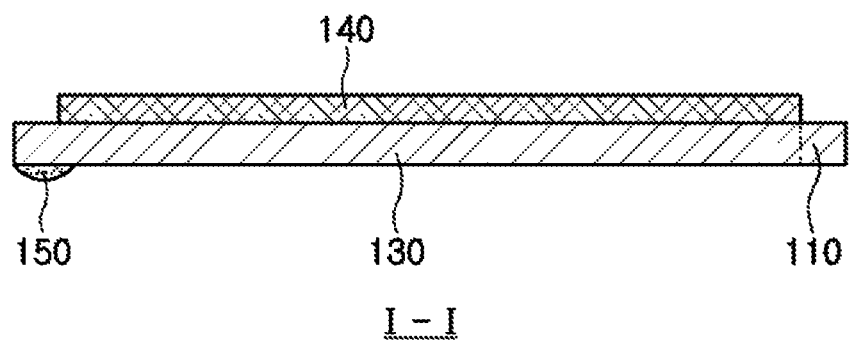
FIG. 2 is a cross-sectional view of the lens driving device taken along line I-I of FIG. 1.

A cross-sectional shape of the lens driving device according to an embodiment taken along line I-I of FIG. 1 will be described with reference to FIG. 2.

In the lens driving device 100, the protective member 150 is formed so as not to overlap with the actuator 140. Referring to the example in FIG. 2, the actuator 140 is formed on one surface of the connection member 130, and the protective member 150 is formed on the other surface of the connection member 130. The position of the protective member 150 as described above may prevent driving force and driving reliability of the actuator 140 from being deteriorated by the protective member 150.

A cross-sectional shape of the lens driving device according to the embodiment taken along line II-II of FIG. 1 will be described with reference to FIG. 3.

Figure 3:
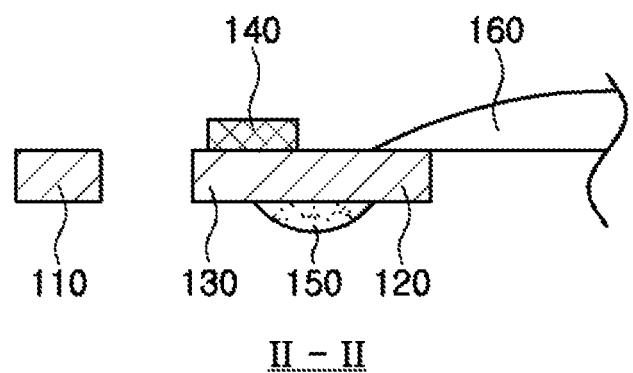
FIG. 3 is a cross-sectional view of the lens driving device taken along line II-II of FIG. 1.

In the lens driving device 100 according to FIG. 3, the protective member 150 is formed on the connection portion between the connection member 130 and the movable member 120. The protective member 150 as described above may prevent the connection portion from being damaged due to frequent movement of the movable member 120.

The position of the protective member 150 may be restricted to the connection portion between the movable member 120 and the connection member 130. As an example, a formation region of the protective member 150 is limited to between the connection member and up to an adhesion region of the movable member 120 to which the lens 160 is adhered in order to prevent contamination of the lens 160 by the protective member 150.

Next, a lens driving device according to another embodiment will be described. For reference, the components similar to those in the embodiment described above will be denoted by the same reference numerals, and a description thereof will be omitted.

Figure 4:
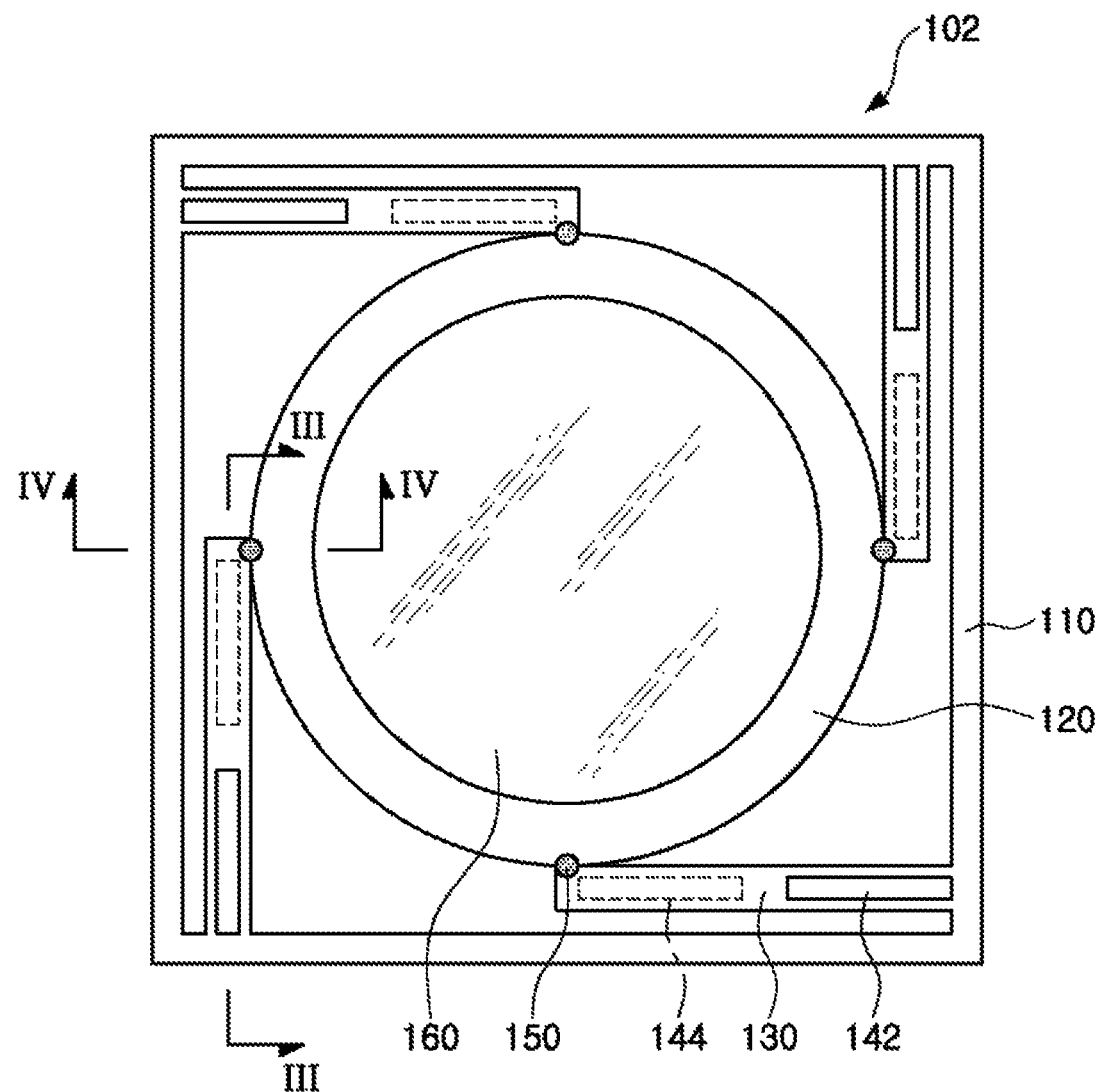
FIG. 4 is a plan view of a lens driving device according to another embodiment.

Referring to FIG. 4, in a lens driving device 102, according to another embodiment, actuators 142 and 144 are formed on both surfaces of a connection member 130. Here, a magnitude of driving force generated by a first actuator 142 may be different from that of driving force generated by a second actuator 144. The position of the actuators 142 and 144 as described above may have a wide formation region for a protective member 150. As an example, the protective member 150 may be formed on an upper surface of the connection member 130.

In addition, due to the positions of the actuators 142 and 144 as described above, a movable member 120 may be finely adjusted by individually controlling the actuators 142 and 144. As an example, the movable member 120 may be moved by a first displacement magnitude by driving only the first actuator 142. As another example, the movable member 120 may be moved by a second displacement magnitude by driving only the second actuator 144. As another example, the movable member 120 may be moved by a third displacement magnitude by driving both of the first and second actuators 142 and 144 in the same direction as each other. As another example, the movable member 120 may be moved by a fourth displacement magnitude by driving both of the first and second actuators 142 and 144 in different directions from each other.

A cross-sectional shape of the lens driving device according to another embodiment taken along line III-III of FIG. 4 will be described with reference to FIG. 5.

Figure 5:
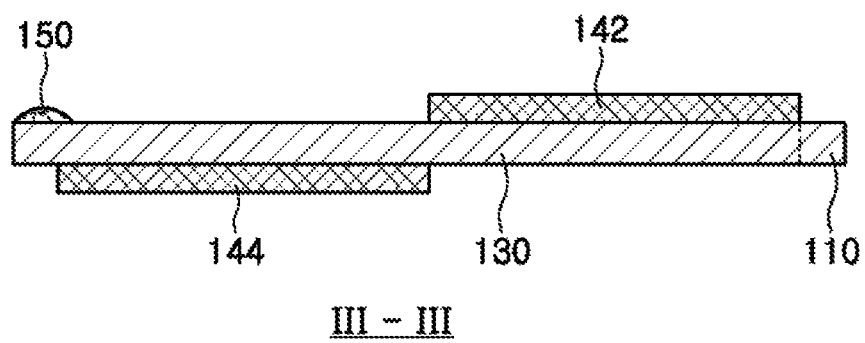
FIG. 5 is a cross-sectional view of the lens driving device taken along line III-III of FIG. 4.

Referring to FIG. 5, the actuators 142 and 144 are formed on upper and lower surfaces of the connection members 130. The first actuator 142 may be formed to extend from a connection portion between a fixed member 110 and the connection member 130 to a central portion of the connection member 130. The second actuator 144 may be formed to extend from the central portion of the connection member 130 to a connection portion between the connection member 130 and the movable member 120. A length of the first actuator 142 may be the same as or different from that of the second actuator 144.

The protective member 150 is formed on the connection portion between the connection member 130 and the movable member 120. The protective member 150 may not overlap the second actuator 144. In other words, the protective member 150 may not contact the second actuator 144.

A cross-sectional shape of the lens driving device according to another embodiment taken along line IV-IV of FIG. 4 will be described with reference to FIG. 6.

Figure 6:
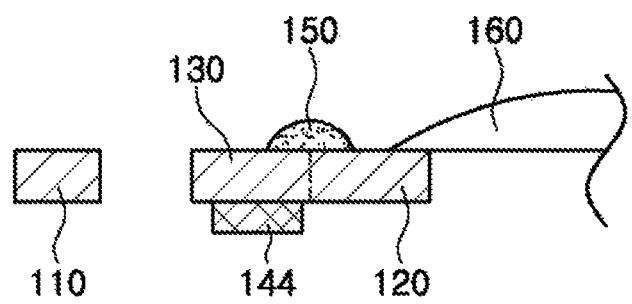
FIG. 6 is a cross-sectional view of the lens driving device taken along line IV-IV of FIG. 4.

Referring to FIG. 6, the protective member 150 is formed on the connection portion between the connection member 130 and the movable member 120, as described above. In addition, the protective member 150 does not extend to a region on which the second actuator 144 is disposed. Further, the protective member 150 is formed so as not to overlap a lens 160.

A lens driving device according to another embodiment will be described with reference to FIG. 7.

Figure 7:
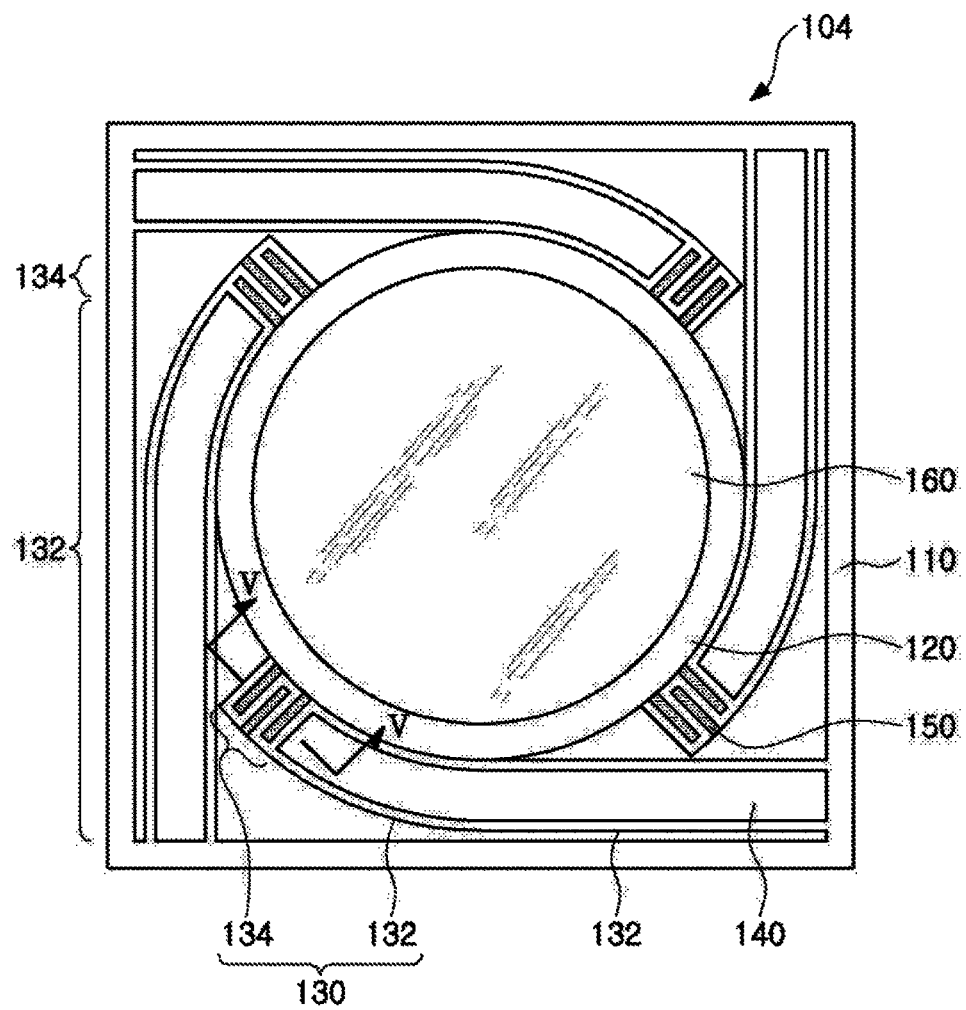
FIG. 7 is a plan view of a lens driving device according to another embodiment.

Referring to FIG. 7, a lens driving device 104 according to another embodiment includes a connection member 130 having a different shape. For example, the connection member 130 includes a first region 132 in which an actuator 140 is formed and a second region 134 in which warpage due to deformation occurs.

The first region 132 include a majority of the connection member 130, extending from a connection portion, between a fixed member 110 and the connection member 130 to the second region 134. Conversely, the second region 134 includes a minority of the connection member 130 connected to a movable member 120.

In the second region 134, warpage due to deformation may easily occur. As an example, the second region 134 may have a meandering, or curved, shape as illustrated in FIG. 7. However, a shape of the second region 134 is not limited to the meandering shape.

A protective member 150 is formed on a portion of the connection member 130 at which elastic deformation or warpage due to deformation occurs. The protective member 150 is formed on the second region 134 of the connection member 130. However, a position of the protective member 150 is not limited to the second region 134. As an example, the protective member 150 may be formed on a region including the first and second regions 132 and 134.

Because, in the lens driving device 104 as described above, warpage due to deformation may easily occur in the second region 134 of the connection member 130, displacement of the movable member 120 through the actuator 140 may be significantly increased. In addition, because the protective member 150 is formed in a weak portion (e.g., the second region 134) of the connection member 130 in the lens driving device 104, damage of the connection member 130 due to warpage may be significantly decreased.

A cross-sectional shape of the lens driving device according to another embodiment taken along line V-V of FIG. 7 will be described with reference to FIG. 8.

Figure 8:
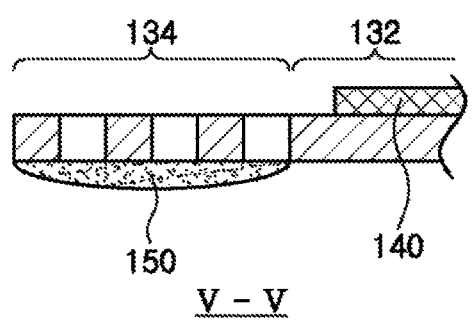
FIG. 8 is a cross-sectional view of the lens driving device taken along line V-V of FIG. 7.

Referring to FIG. 8, the protective member 150 is formed at the second region 134 of the connection member 130. As an example, the protective member 150 is formed below the second region 134 so as not to interfere with the actuator 140. The protective member 150 is provided on an open space of the second region 134. As an example, the protective member 150 may be formed to completely cover the second region 134 having the meandering or curved shape.

The protective member 150 as described above may increase the rigidity of the second region 134, thereby significantly decreasing damage due to warpage in the second region 134.

A lens driving device according to another embodiment will be described with reference to FIGS. 9 and 10.

Figure 9:
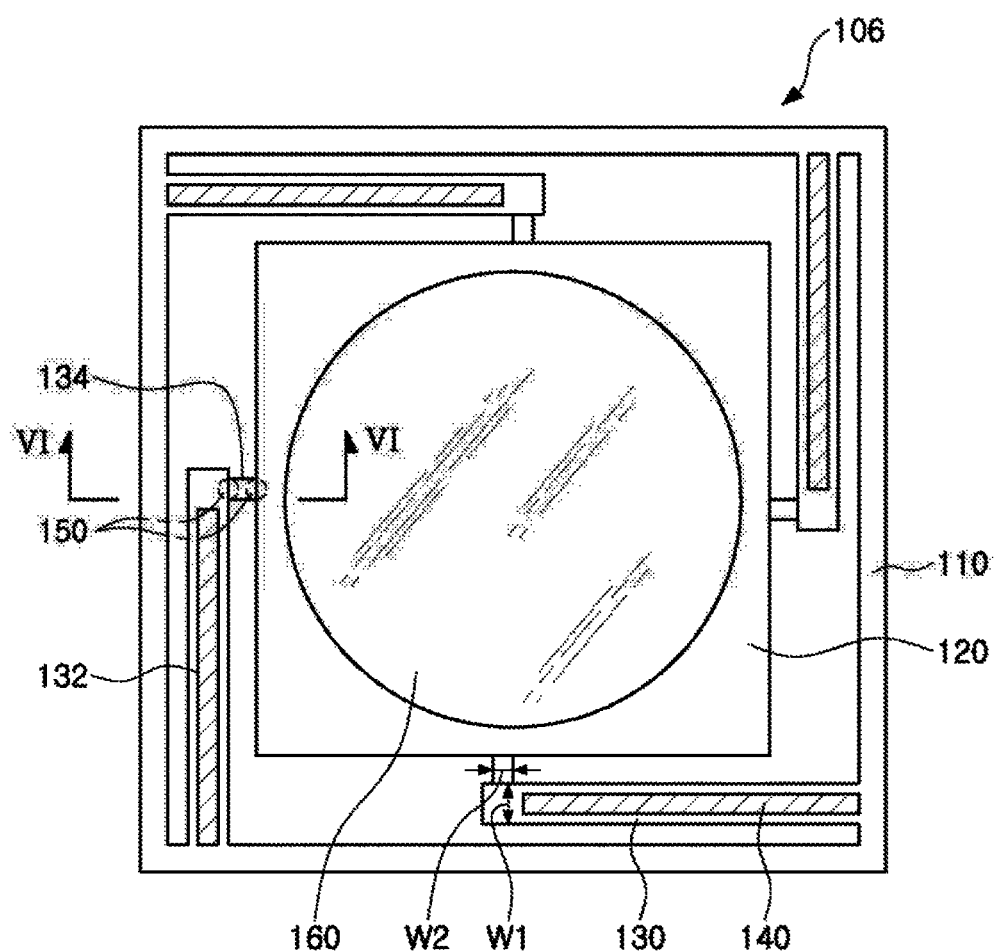
FIG. 9 is a plan view of a lens driving device according to another embodiment.
Figure 10:
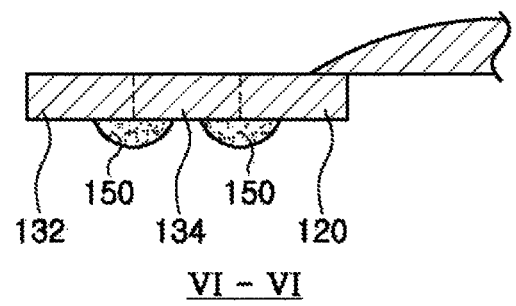
FIG. 10 is a cross-sectional view of the lens driving device taken along line VI-VI of FIG. 9.

In reference to FIG. 9, a lens driving device 106 includes a connection member 130 partitioned into first and second regions 132 and 134 having different physical properties from each other. The first region 132 is a portion on which an actuator 140 is formed or disposed. As an example, the first region 132 is a portion having a first width W1 in the connection member 130. The second region 134 is a portion in which warpage due to deformation may easily occur. As an example, the second region 134 is a portion having a second width W2 in the connection member 130. The second width W2 may be narrower than the first width W1.

A protective member 150 is formed on the second region 134 of the connection member 130. The protective member 150 is formed on a boundary portion between the first and second regions 132 and 134 and a connection portion between the second region 134 and a movable member 120, respectively, as illustrated in FIG. 10. As another example, the protective member 150 is formed on a portion including the second region 134. In more detail, the protective member 150 may be formed to extend from the boundary portion, e.g., between the first and second regions 132 and 134, to the connection portion, e.g., between the second region 134 and a movable member 120.

In the lens driving device 106 as described above, it may be easy to secure displacement of the movable member 120 through the second region 134 of the connection member 130. Further, it may be easy to manufacture the connection member 130 of the lens driving device 160 according to one or more embodiments.

A lens driving device according to another embodiment will be described with reference to FIG. 11.

Figure 11:
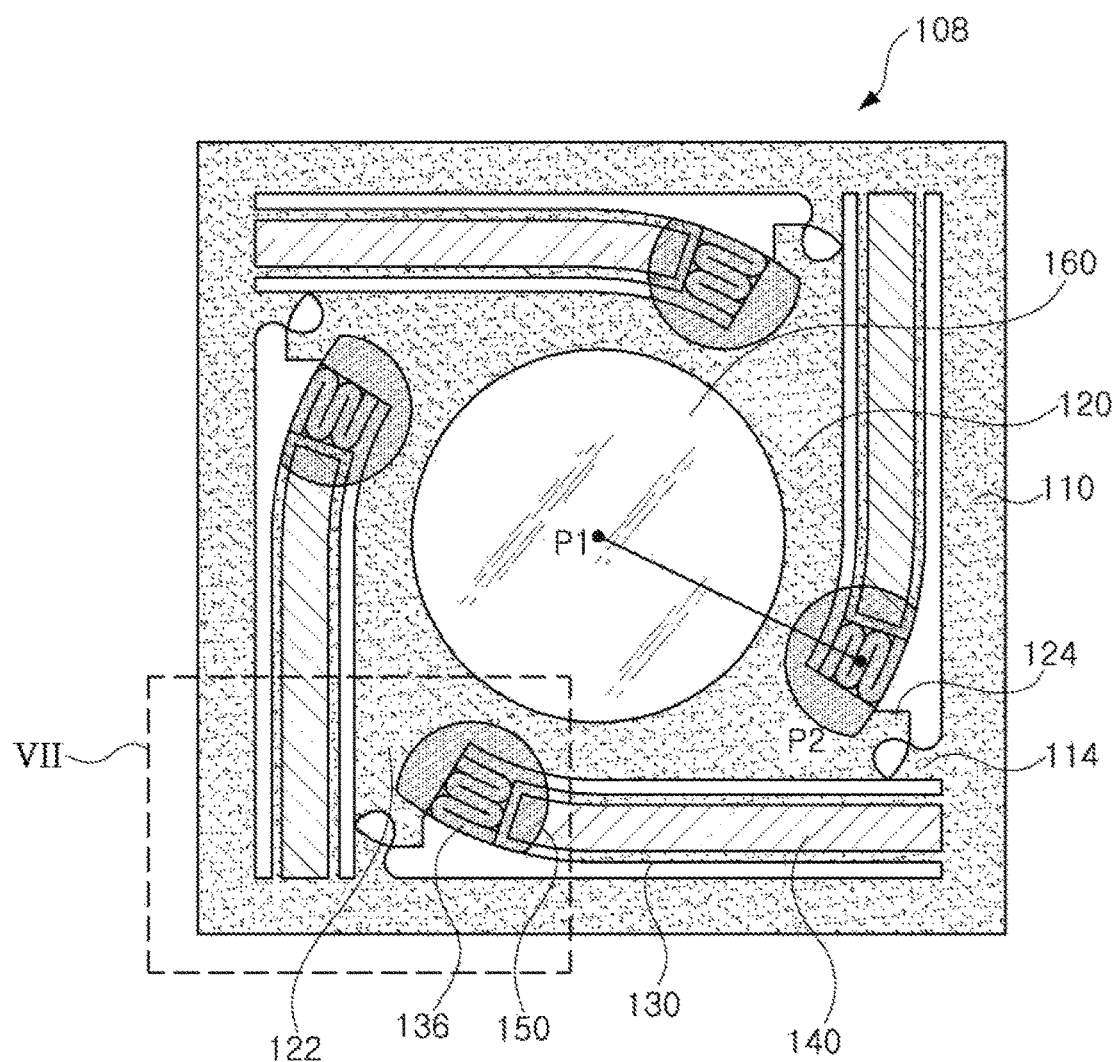
FIG. 11 is a plan view of a lens driving device according to another embodiment.

In reference to FIG. 11, a lens driving device 108 includes a movable member 120 having a plurality of wing portions 122 protruding in a substantially radial direction. Four wing portions 122 may be formed to have the same interval therebetween based on the movable member 120. The wing portions 122 as described above are connected to connection members 130 by elastic members 136.

The lens driving device 108 according to an embodiment may be different in shapes of a fixed member 110 and the movable member 120 from the other embodiments described above. For example, restriction portions 114 and 124 are formed in the fixed member 110 and the movable member 120, respectively. The restriction portions 114 of the fixed member 110 protrude toward the movable member 120, and the restriction portions 124 of the movable member 120 protrude from the wing portions 124 toward the fixed member 110.

The restriction portions 114 and 124 may be formed in a substantially curved shape. The restriction portions 114 and 124 as described above may be point-contacted with each other at two or more points, thereby restricting movement of the moveable member. Therefore, movement of the movable member 120 in a direction perpendicular to an optical axis may be reduced or prevented through the restriction portions 114 and 124.

A protective member 150 is formed on an elastic member 136. In addition, the protective member 150 is also partially formed on regions of the connection member 130, the wing portion 122, and the movable member 120 which are adjacent to the elastic member 136. The protective member 150 as described above may absorb impact applied to the elastic member 136.

Table 1 illustrates displacement values at each point according to a drop test of the lens driving device.

TABLE 1

| Reference | Before Forming Protective Member [μm] | After Forming Protective Member [μm] |
| --- | --- | --- |
| Point P1 | 62.05 | 57.66 |
| Point P2 | 62.13 | 44.17 |

As illustrated in Table 1, in a conventional lens driving device in which the protective member was not formed, significant displacement was generated in a central point P1 and a connection point P2. Conversely, in the lens driving device 108 in which the protective member 150 was formed, displacement was decreased in both a central point P1 and a connection point P2. In particular, displacement by impact was significantly decreased in the connection point P2 on which the protective member 150 was formed. Therefore, damage of the lens driving device by drop impact may be significantly decreased by including a protective member 150.

Figure 12:
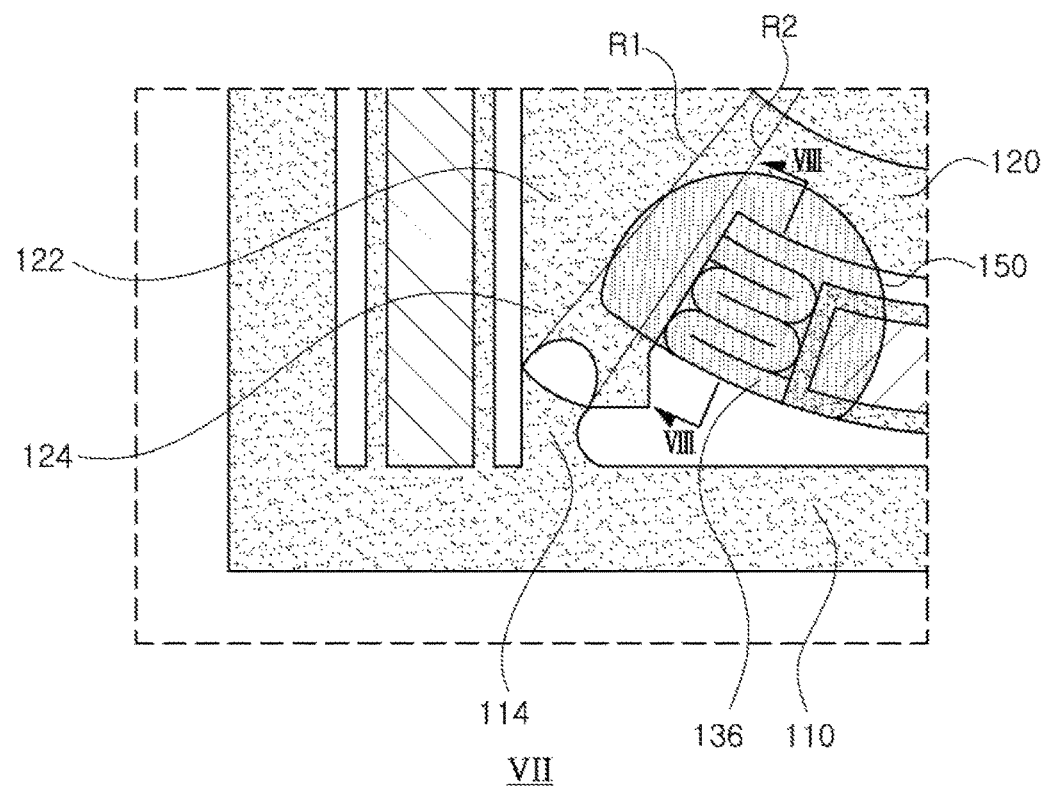
FIG. 12 is an enlarged view of part VII illustrated in FIG. 11.

Contact of the restriction portions 114 and 124 will be described with reference to FIG. 12.

The restriction portions 114 and 124 are point-contacted with each other as described above. As an example, the restriction portions 114 and 124 are point-contacted with each other at two points. Distances of the point-contact points of the restriction portions 114 and 124 from the center of the movable member 120 may be the same as each other.

As an example, a distance R1 from the center of the movable member 120 to one contact point may be the same as a distance R2 from the center thereof to the other contact point. The restriction portions 114 and 124 as described above may suppress, or reduce, unnecessary movement of the movable member 120.

A cross-sectional shape of the lens driving device taken along line VIII-VIII of FIG. 12 will be described with reference to FIG. 13.

Figure 13:
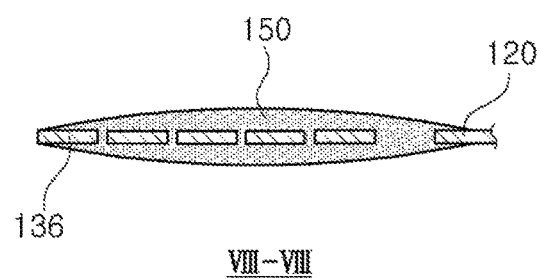
FIG. 13 is a cross-sectional view of the lens driving device taken along line VII-VII of FIG. 12.

Referring to FIG. 13, the protective member 150 covers both upper and lower portions of the elastic member 136. In addition, the protective member 150 may fill an empty space between the elastic member 136 and the movable member 120. The protective member 150 as described above may absorb impact generated in the vicinity of the elastic member 136.

As set forth above, according to one or more embodiments, auto-focusing may be rapidly and accurately performed, and a thickness of the mobile device may be reduced.

As a non-exhaustive example only, a mobile device as described herein may be a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driving device comprising:
   a fixed member;
   a movable member configured to move with respect to the fixed member;
   a lens disposed in or on the movable member;
   a connection member attached directly to the fixed member and supporting the movable member;
   at least one actuator disposed on and wholly supported by the connection member; and
   a protective member disposed on the connection member at a connection portion thereof, wherein the connection portion is adjacent to the fixed member or adjacent to the movable member.

2. The lens driving device of claim 1, wherein the at least one actuator comprises:
   a first actuator disposed on a first surface of the connection member; and
   a second actuator disposed on a second surface of the connection member.

3. The lens driving device of claim 2, wherein the first and second actuators have different driving forces from each other.

4. The lens driving device of claim 3, wherein the first surface of the connection member is opposite the second surface of the connection member.

5. The lens driving device of claim 1, further comprising a sensor, disposed on the fixed member or the movable member, configured to sense movement of the movable member with respect to the fixed member.

6. The lens driving device of claim 1, wherein the protective member comprises a silicone material.

7. The lens driving device of claim 1, wherein the protective member comprises a material with a Young's modulus lower than that of the connection member.

8. The lens driving device of claim 1, wherein the protective member comprises a material with an elastic modulus of 1 GPa or less.

9. The lens driving device of claim 1, wherein the fixed member, the movable member, and the connection member are integrally formed with each other on a silicon wafer.

10. The lens driving device of claim 1, wherein the protective member extends from the connection portion to the at least one actuator.

11. The lens driving device of claim 1, wherein the connection member extends tangentially from the movable member.

12. The lens driving device of claim 1, wherein the protective member includes an impact-absorbing material.

13. A lens driving device comprising:
    a fixed member;
    a movable member in which a lens is disposed;
    a connection member comprising a first region and a second region;
    an actuator, disposed on the connection member in the first region, configured to elastically deform the second region; and
    a protective member formed on the connection member.

14. The lens driving device of claim 13, wherein the protective member is disposed on the connection member in the second region.

15. The lens driving device of claim 13, wherein the second region comprises a meandering shape.

16. The lens driving device of claim 13, wherein the second region has a width narrower than that of the first region.

17. The lens driving device of claim 13, wherein the second region is formed on a connection portion, wherein the connection portion is adjacent to the fixed member or adjacent to the movable member, or both.

18. The lens driving device of claim 13, wherein wing portions radially extend from the movable member to the fixed member.

19. The lens driving device of claim 18, wherein restriction portions configured to restrict movement of the movable member in a direction perpendicular to an optical axis are formed on the fixed member and the wing portions.

20. A lens driving device comprising:
a fixed member;
a movable member in which a lens is disposed;
a connection member comprising a first region and a second region;
an actuator, disposed on the connection member in the first region, configured to elastically deform the second region; and
a protective member formed on the connection member and including an impact-absorbing material.

21. A lens driving device comprising:
a fixed member;
a movable member configured to move with respect to the fixed member;
a lens carried by the movable member;
a plurality of connection members connecting the fixed member to the movable member;
a plurality of actuators; and
a plurality of protective members, wherein:
at least one actuator is disposed on and supported solely by each connection member, and
a protective member is disposed on each connection member at a connection portion thereof, wherein the connection portion is adjacent to the fixed member or adjacent to the movable member.

* * * * *